United States Patent
Maruyama (10) Patent No.: US 10,084,924 B2
(45) Date of Patent: Sep. 25, 2018

(54) INTERCOM SYSTEM FOR COLLECTIVE HOUSING

(71) Applicant: AIPHONE CO., LTD., Nagoya-shi, Aichi (JP)

(72) Inventor: Norio Maruyama, Nagoya (JP)

(73) Assignee: AIPHONE CO., LTD., Nagoya-Shi, Aichi (JP)

( * ) Notice: Subject to any disclaimer, the term of this patent is extended or adjusted under 35 U.S.C. 154(b) by 0 days.

(21) Appl. No.: 15/547,163

(22) PCT Filed: Feb. 26, 2015

(86) PCT No.: PCT/JP2015/055626
§ 371 (c)(1),
(2) Date: Jul. 28, 2017

(87) PCT Pub. No.: WO2016/121133
PCT Pub. Date: Aug. 4, 2016

(65) Prior Publication Data
US 2018/0027124 A1    Jan. 25, 2018

(30) Foreign Application Priority Data
Jan. 30, 2015  (JP) ................. 2015-017783

(51) Int. Cl.
H04M 1/60      (2006.01)
H04M 9/00      (2006.01)
H04M 11/02     (2006.01)

(52) U.S. Cl.
CPC ......... *H04M 9/003* (2013.01); *H04M 11/025* (2013.01)

(58) Field of Classification Search
CPC ............. H04L 12/2838; H04L 12/282; H04L 2012/2843; H04L 2012/285;
(Continued)

(56) References Cited

U.S. PATENT DOCUMENTS

| 6,748,061 B2 * | 6/2004 | Ahlstrom ............ H04M 11/025 379/102.01 |
| 2003/0132830 A1* | 7/2003 | Dow ................. G07C 9/00103 340/5.22 |
| 2010/0316237 A1* | 12/2010 | Elberbaum .......... H04M 11/025 381/300 |

FOREIGN PATENT DOCUMENTS

JP    2001-258015    *  9/2001
JP    2001-258015 A     9/2001
(Continued)

OTHER PUBLICATIONS

International Search Report and Written Opinion for PCT App No. PCT/JP2015/055626 dated May 19, 2015, 7 pgs.
(Continued)

*Primary Examiner* — Binh Kien Tieu
(74) *Attorney, Agent, or Firm* — Procopio, Cory, Hargreaves & Savitch LLP (57) ABSTRACT

An intercom system for an apartment house according to the invention includes room units (10A, 10B) which are installed in respective rooms of the apartment house, and a control unit (20) which is connected to the room units (10A, 10B) of the respective rooms via an intercom line (L1) so as to be capable of communicating therewith, and is capable of communicating with an external server (S) via an external communication network. The control unit (2) acquires, based on a request signal transmitted from the room unit (10) via the intercom line (L1), predetermined information corresponding to the request signal from the external server (S) via the external communication network, and transmits the acquired predetermined information via the intercom line (L1) to the room unit (10) which transmitted the request signal.

17 Claims, 7 Drawing Sheets

(58) Field of Classification Search
CPC ........... H04M 11/025; H04N 21/43615; H04R 2227/005; H04R 27/00; G05B 15/02
USPC ............ 379/167.01, 167.02, 167.08, 167.12, 379/167.05, 167.11, 167.14, 167.15
See application file for complete search history.

(56) References Cited

FOREIGN PATENT DOCUMENTS

| JP | 2002247232 A | | 8/2002 |
|---|---|---|---|
| JP | 2010-177818 A | | 8/2010 |
| JP | 2010-177818 | * | 9/2010 |
| JP | 2012-109684 A | | 6/2012 |
| JP | 2012-109685 | * | 6/2012 |
| JP | 2012-109685 A | | 6/2012 |

OTHER PUBLICATIONS

Extended European Search Report for related European Patent Application No. 15880028.4, dated May 29, 2018, 8 pages.

* cited by examiner

INTERCOM SYSTEM FOR COLLECTIVE HOUSING

CROSS-REFERENCE TO RELATED APPLICATIONS

This application is a U.S. National Stage entry of PCT Application No. PCT/JP2015/055626, filed on Feb. 26, 2015, which claims priority to Japanese Patent Application No. 2015-017783, filed Jan. 30, 2015, the contents of which are incorporated herein by reference.

TECHNICAL FIELD

The present invention relates to an intercom system for an apartment house capable of acquiring external information.

BACKGROUND ART

In an intercom system for an apartment house, room units installed in respective rooms have been progressed in multifunctionality. For example, there is an intercom system in which a room unit is provided with a communication part capable of communicating with the internet, and content such as characters and images is downloaded via the internet and displayed on a display part of the room unit (see Patent Document 1).

PRIOR ART DOCUMENT

Patent Document

Patent Document 1: JP-A-2012-109685

SUMMARY OF INVENTION

Problems to be Solved by Invention

According to the patent document 1, multifunctionality of the room unit is achieved by providing the communication part in the room unit. However, in other words, a room unit which does not include a communication part cannot achieve multifunctionality. If a communication part, for directly communicating with an external communication network such as the internet, is provided in each of all the room units installed in respective rooms of an apartment house, this configuration raises cost thereof.

Accordingly, an object of the invention is to provide an intercom system for an apartment house that can achieve multifunctionality of a room unit while suppressing increase of cost.

Means for Solving Problems

In order to attain the object, an intercom system for an apartment house according to the invention includes:
room units which are installed in respective rooms of the apartment house; and
a control unit which is connected to the room units of the respective rooms via an intercom line so as to be capable of communicating therewith, and is capable of communicating with an external server via an external communication network, wherein
the control unit acquires, based on a request signal transmitted from the room unit via the intercom line, predetermined information corresponding to the request signal from the external server via the external communication network, and transmits the acquired predetermined information via the intercom line to the room unit which transmitted the request signal.

According to this configuration, the control unit acquires information requested by the room unit from the external server via the intercom line and transmits the acquired information to the room unit via the intercom line. Thus, without providing a communication part in the room unit, the room unit can obtain a function of acquiring information from the outside. In this manner, multifunctionality of the room unit can be achieved while suppressing increase of cost due to addition of the communication part.

In the intercom system for an apartment house according to the invention,
the intercom line may include at least two communication channels, and
the control unit may check a use state of the intercom line when receiving the request signal, and acquire the predetermined information from the external server when the intercom line has a vacant channel.

The number of channels of the intercom line is designed based on a use frequency of the intercom line. Thus, in general, the number of channels of the intercom line is small as compared with the total number of rooms of an apartment house. According to the above-described configuration, a condition for using the intercom line so as to acquire information from the external server is limited only to a case where the intercom line has a vacant channel. Consequently, congestion of the intercom line can be suppressed, and a vacant line can be easily secured for emergent functions of the intercom such as emergency broadcast.

In the intercom system for an apartment house according to the invention,
the control unit may check a use state of the intercom line when receiving the request signal, and acquire the predetermined information from the external server when the intercom line has two or more vacant channels.

According to this configuration, as at least two vacant channels are secured, the system can be surely ready for use of the intercom line at the time of emergency broadcast.

In the intercom system for an apartment house according to the invention,
the control unit may transmit to the room unit a message representing that the predetermined information can be transmitted when the intercom line has a vacant channel, while transmit to the room unit a message representing that the predetermined information cannot be transmitted when the intercom line has not any vacant channel for transmitting the predetermined information.

According to this configuration, an operator can know whether requested information can be provided quickly.

In the intercom system for an apartment house according to the invention,
priority order may be assigned to plural functions using the intercom line,
the plural functions may include an information acquiring function in which the room unit acquires the predetermined information from the external server via the control unit, and
when a function having a higher priority than the information acquiring function is required to be used while the predetermined information is transmitted to the room unit via the intercom line, the control unit may interrupt the information acquiring function and release the channel of the intercom line having been used for the information acquiring function.

According to this configuration, the function of a higher priority such as emergency broadcast can be executed preferentially even during execution of the information acquiring function.

In the intercom system for an apartment house according to the invention, the control unit may acquire the predetermined information from the external server in a preset time zone.

According to this configuration, for example, information can be acquired from the external server avoiding a time zone in which a use-frequency of the intercom line is high.

In the intercom system for an apartment house according to the invention, the time zone may be a time zone during which a use-frequency of the intercom line is relatively low in one day.

According to this configuration, for example, information can be surely acquired from the external server by utilizing the intercom line in a night time zone in which a use-frequency of the intercom line is low.

In the intercom system for an apartment house according to the invention, the control unit may perform, in the time zone, periodic diagnosis of the intercom line simultaneous with an operation of acquiring the predetermined information from the external server and transmitting to the room unit.

According to this configuration, periodic diagnosis of checking whether the intercom line operates normally can be executed together with an operation of the information acquiring function of acquiring information from the external server. Thus, the intercom line can be used efficiently.

Advantageous Effects of Invention

According to the intercom system for an apartment house of the invention, multifunctionality of the room unit can be achieved while suppressing increase of cost.

EMBODIMENTS OF INVENTION

Hereinafter an embodiment will be explained in detail with reference to drawings.

Figure 1:
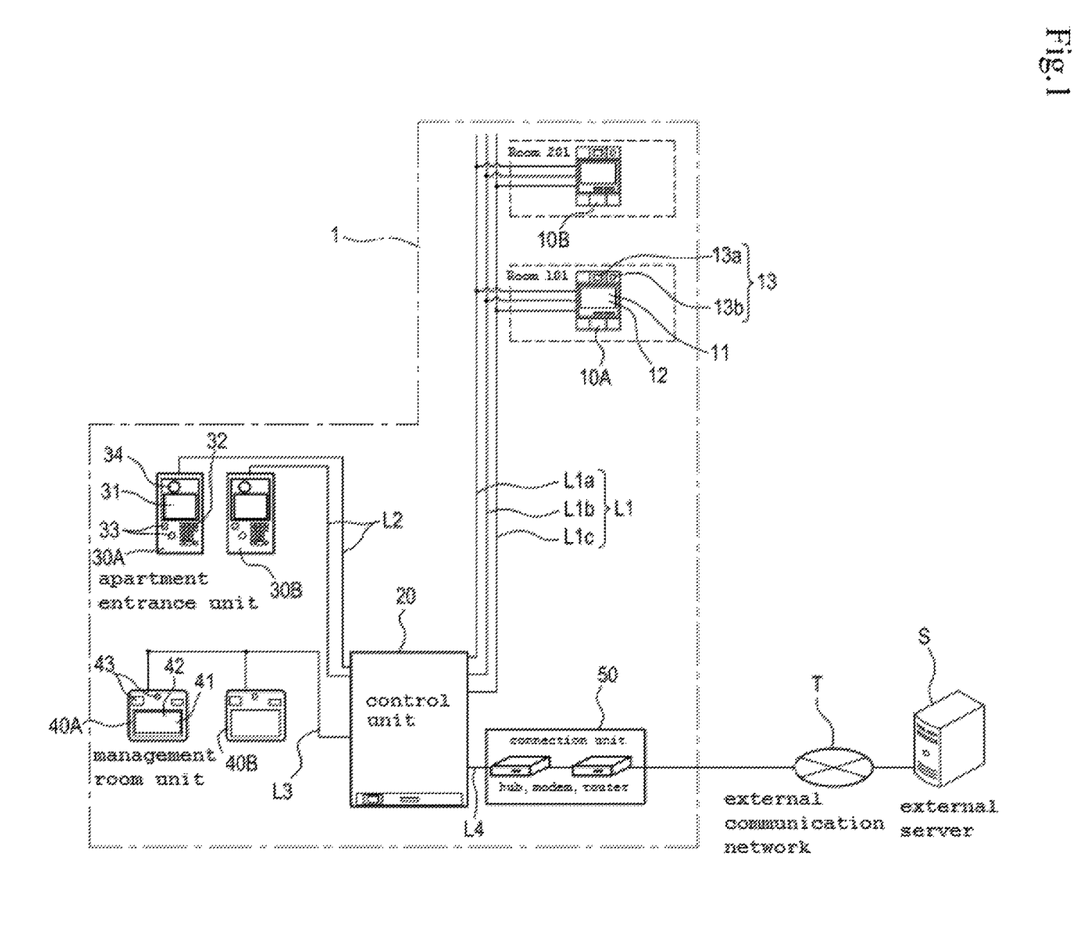
FIG. 1 is a configuration diagram of an intercom system for an apartment house according to an embodiment of the invention.

As shown in FIG. 1, an intercom system 1 for an apartment house includes a plurality of (two in this embodiment) room units 10A, 10B (hereinafter called a "room unit 10" in a case of being referred collectively), a control unit 20, a plurality of (two in this embodiment) apartment entrance units 30A, 30B (hereinafter called an "apartment entrance unit 30" in a case of being referred collectively), a plurality of (two in this embodiment) management room units 40A, 40B (hereinafter called a "management room unit 40" in a case of being referred collectively), and a connection unit 50. The intercom system 1 for an apartment house is an intercom unit applied to an apartment house such as a condominium.

The room units 10A and 10B are installed in dwelling rooms (rooms) of dwellings such as Room 101 and Room 102, respectively. Each of the room units 10A and 10B includes a display part 11, an operation part 12, and a communication part 13. The display part 11 displays, for example, information acquired by the control unit 20, images imaged by the apartment, entrance unit 30, and operation information for operating a touch panel. The display part 11 is configured, for example, by a display medium such as a liquid crystal display. The operation part 12 is operated, for example, at the time of requesting acquisition of information to the control unit 20, at the time of responding to a call from the apartment entrance unit 30 or the management room unit 40, and at the time of terminating communication being established. The operation part 12 is configured by, for example, operation buttons of the touch panel arranged on a screen of the display part 11 or operation buttons provided on a surface of a casing. The communication part 13 includes a speaker 13a and a microphone 13b, and receives and outputs a voice signal so that a resident makes a speech with the apartment entrance unit 30 side or the management room unit 40 side.

The control unit 20 controls operations of the room unit 10, the apartment entrance unit 30, the management room unit 40, and the like.

The apartment entrance units 30A and 30B are installed in an apartment entrance as a shared space of the apartment house. Each of the apartment entrance units 30A and 30B includes a display part 31, an operation part 32, a communication part 33, and an imaging part 34. The display part 31 displays operation content of the operation part 32 and images imaged by the imaging part 34. The operation part 32 is operated, for example, at the time of calling particular one of the room units 10 or the management room unit 40. The communication part 33 is used when a visitor makes a speech with the apartment entrance unit 30 side or the management room unit 40 side. The imaging part 34 images an image of a visitor and others who performed a calling operation.

The management room units 40A and 40B are installed in a management room of the apartment house. Each of the management room units 40A and 40B includes a display part 41, an operation part 42, and a communication part 43. The display part 41 displays, for example, images imaged by the apartment entrance unit 30, and operation information. The operation part 42 is operated, for example, at the time of calling particular one of the room units 10. The communication part 43 is used when a caretaker makes a speech with the apartment entrance unit 30 side or the management room unit 40 side.

The connection unit 50 is used for connecting the control unit 20 to an external communication network (for example, internet) T and configured by, for example, a modem, a router or a hub.

The room unit 10 and the control unit 20 are connected to each other via a room unit line L1 so as to be capable of communicating therebetween. The apartment entrance unit 30 and the control unit 20 are connected to each other via an entrance unit line L2 so as to be capable of communicating therebetween. The management room unit 40 and the control unit 20 are connected to each other via a management room unit line L3 so as to be capable of communicating therebetween. Each of the room unit line L1, the entrance unit line L2, and the management room unit line L3 forms an intercom line. The control unit 20 is connected to the connection unit 50 via a LAN (Local Area Network) cable L4. Further, the control unit 20 is connected to an external sever S via the communication network T so as to be capable of communicating therewith.

The room unit line L1 includes a data line L1$a$ and two communication lines L1$b$ and L1$c$ (hereinafter referred to as a first channel L1$b$ and a second channel L1$c$, respectively).

The data line L1$a$ is used when a signal (hereinafter referred to as a request signal), which is outputted from the room unit 10 so as to request acquisition of information, is transmitted to the control unit 20 from the room unit 10 and used when a response signal to the request signal is transmitted from the control unit 20 to the room unit 10. Further, the data line L1$a$ is used when a call signal, which is outputted from the apartment entrance unit 30 or the management room unit 40, is transmitted to the room unit 10.

The first channel L1$b$ is used when transmitting a voice signal and an image signal in a case of making a speech between the room unit 10 and the apartment entrance unit 30 or between the room unit 10 and the management room unit 40. The first channel L1$b$ in this embodiment is provided as a speech dedicated line used for making a speech.

The second channel L1$c$ is used when information acquired by the control unit 20 is transmitted from the control unit 20 to the room unit 10. Further, the second channel L1$c$ is used when character information and voice information (for example, message and voice broadcast in an emergency) outputted from the management room unit 40 is transmitting to the room unit 30 from the control unit 20. Further, the second channel L1$c$ is used when transmitting a voice signal and an image signal in a case of making a speech between the room unit 10 and the apartment entrance unit 30 or between the room unit 10 and the management room unit 40. The second channel L1$c$ in this embodiment is provided as a general purpose line which is used not only for making a speech but also for transmitting acquired information or transmitting information in an emergency. In this embodiment, when using the second channel L1$c$, a function of broadcasting a message in an emergency is set to have a higher priority than a speech function and a function of transmitting information acquired by the control unit 20 to the room unit.

The intercom line of the room unit line L1 may be configured by a single digital signal line. In this case, this signal line may virtually constitute the first channel, the second channel, and the data line.

The entrance unit line L2 transmits a voice signal and an image signal in a case of making a speech between the apartment entrance unit 30 and the room unit 10 or between the apartment entrance unit 30 and the management room unit 40. The management room unit line L3 transmits a voice signal and an image signal in a case of making a speech between the management room unit 40 and the room unit 10 or between the management room unit 40 and the apartment entrance unit 30. Each of the entrance unit line L2 and the management room unit line L3 may be configured to have three lines, for example, a data line for transmitting a control signal, a voice line for transmitting a voice signal, and an image line for transmitting an image signal.

Figure 2:
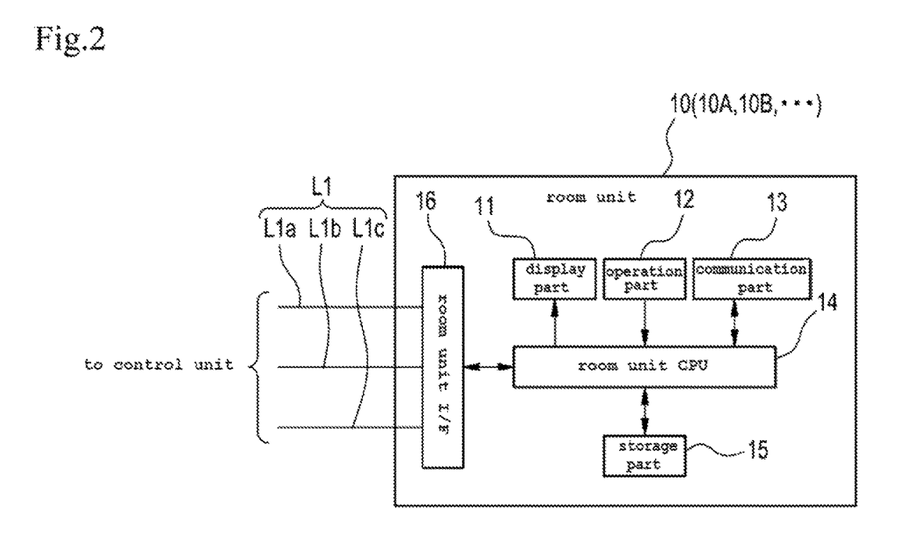
FIG. 2 is a functional block diagram of a room unit in the intercom system for an apartment house.

Next, functions of the room unit 10 will be explained with reference to FIG. 2.

The room unit 10 includes the display part 11, the operation part 12, the communication part 13, a room unit CPU 14, a storage part 15, and a room unit interface (hereinafter referred to as a room unit I/F) 16. The room unit CPU 14 controls operations of the individual parts constituting the room unit 10. The room unit I/F 16 forms a bidirectional signal transmission path between the room unit CPU 14 and the room unit line L1 (L1$a$, L1$b$, L1$c$).

For example, the room unit CPU 14 causes the display part 11 to display an image signal transmitted via the first channel L1$b$, acquired information and image information transmitted via the second channel L1$c$, operation information for operating the touch panel, and the like. Further, the room unit CPU 14 transmits a request signal received from the operation part 12 to the control unit 20 via the data line L1$a$. Further, the room unit CPU 14 transmits a voice signal received from the communication part 13 to the control unit 20 via the first channel L1$b$ or the second channel L1$c$, and also causes the communication part 13 to output a voice signal transmitted via the first channel L1$b$ or the second channel L1$c$. Furthermore, the room unit CPU 14 causes the storage part 15 to store information transmitted via the second channel L1$c$.

Figure 3:
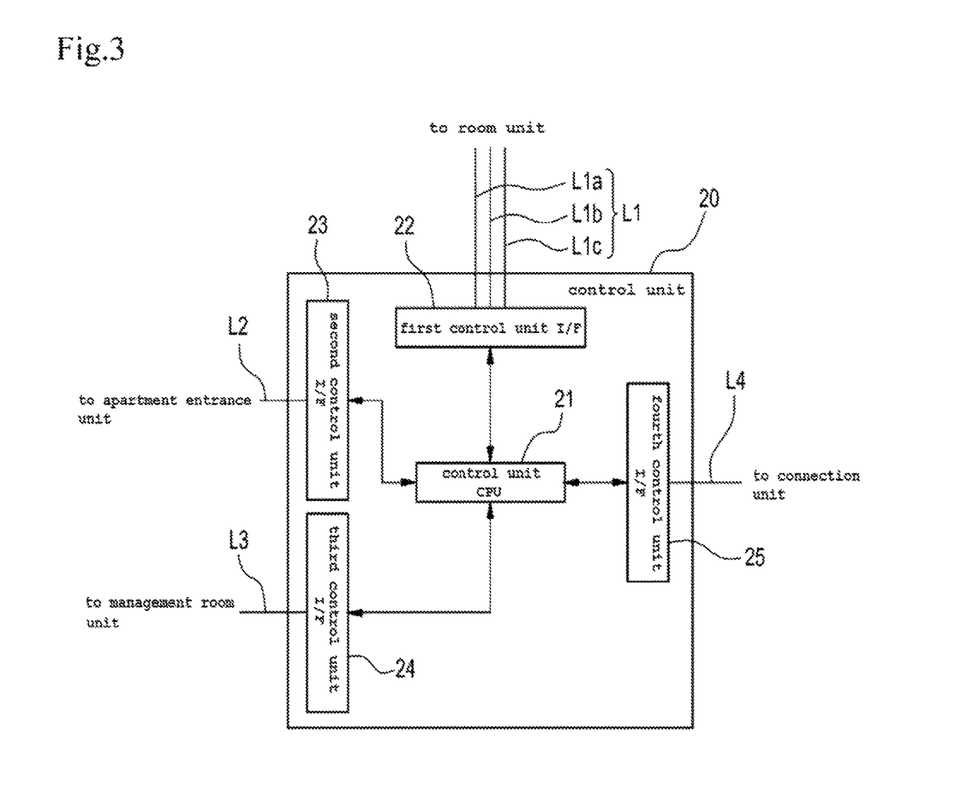
FIG. 3 is a functional block diagram of a control unit in the intercom system for an apartment house.

Next, functions of the control unit 20 will be explained with reference to FIG. 3.

The control unit 20 includes a control unit CPU 21, a first control unit I/F 22, a second control unit I/F 23, a third control unit I/F 24, and a fourth control unit I/F 25. The control unit CPU 21, for example, controls signal transmission among the room unit 10, the apartment entrance unit 30, and the management room unit 40 each connected to the control unit 20, and also controls connection to the external communication network. The first control unit I/F 22 forms a bidirectional signal transmission path between the control unit CPU 21 and the room unit line L1. The second control unit I/F 23 forms a bidirectional signal transmission path between the control unit CPU 21 and the entrance unit line L2. The third control unit I/F 24 forms a bidirectional signal transmission path between the control unit CPU 21 and the management room unit line L3. The fourth control unit I/F 25 is an I/F connectable to the external communication network such as the communication network T and forms a bidirectional signal transmission path between the control unit CPU 21 and the LAN cable L4.

For example, the control unit CPU 21 determines whether requested information is to be acquired with respect to a request signal transmitted from the room unit 10. Further, the control unit CPU 21 determines whether calling is possible with respect to a call signal transmitted from the apartment entrance unit 30 or the management room unit 40. The control unit CPU 21 performs the individual determinations depending on whether the first channel L1$b$ and the second channel L1$c$ provided for speech are used. Further, the control unit CPU 21 determines whether use of the second channel L1$c$ is to be interrupted when an emergency signal requesting emergency use is transmitted from the management room unit 40.

Figure 4:
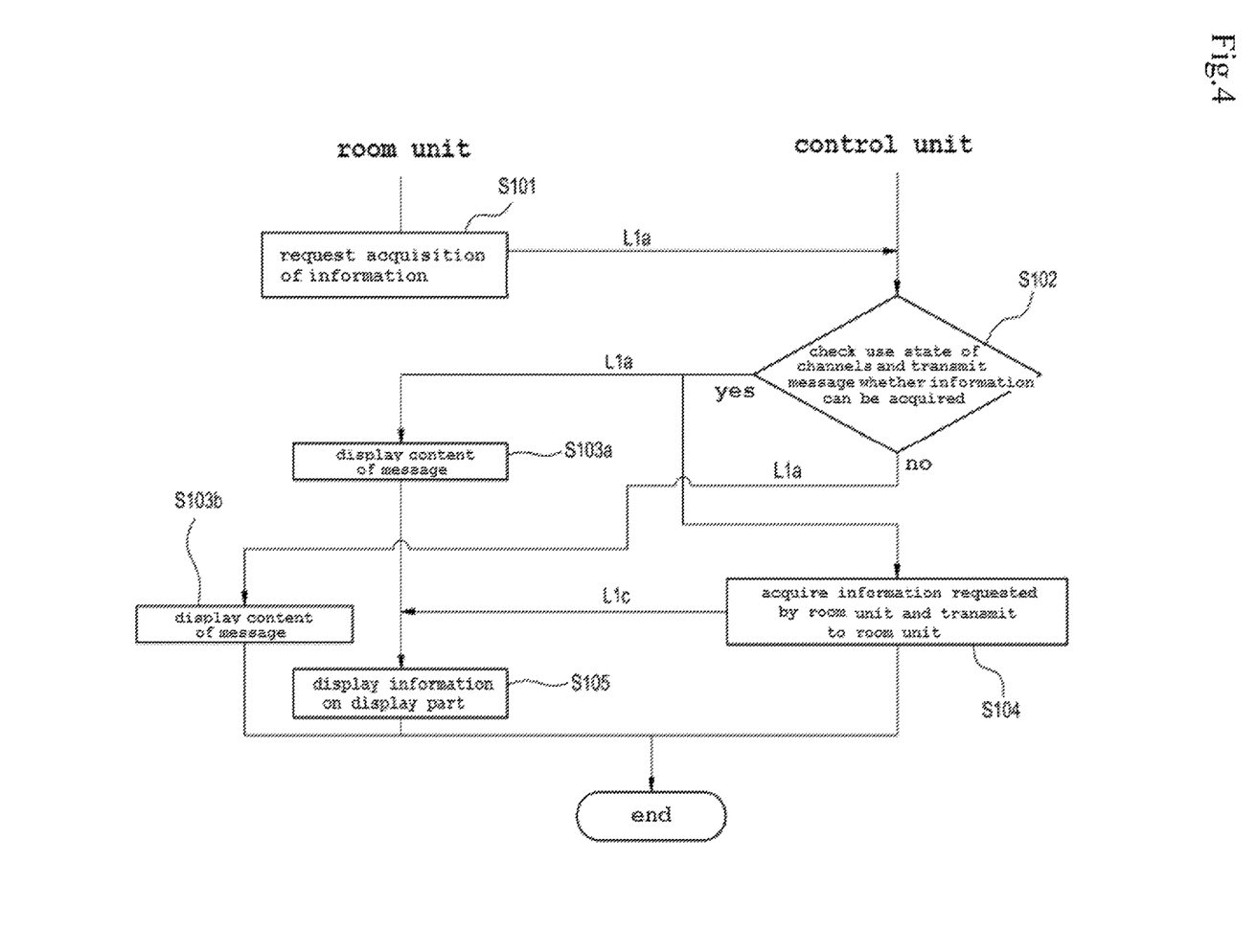
FIG. 4 is a flowchart for explaining an operation of acquiring information.

Next, explanation will be made with reference to FIGS. 4 to 6 as to an operation when the room unit 10 requests acquisition of information.

As pre-setting of this system, for example, content of predetermined information capable of being requested is set as request items by the room units 10A and 10B. As the request items, for example, "electricity usage quantity for each hour on designated date", "electricity usage quantity for each month in designated year", and "electricity bill for each month in each year", are prepared. A URL (Uniform Resource Locator) of acquisition source of information is specified by the control unit 20 in correspondence to the item of information requested by the room unit 10. Further, identification information (building number of apartment house, room number, display language, and the like) for specifying the individual room units 10A and 10B is set by the control unit 20.

First, for example, the room unit 10A of Room 101 issues a request for acquiring information of "electricity usage quantity (bar graph representing time change) on Apr. 9, 2014" (step S101). The request for acquiring information is started based on an operation of the button of the operation part 12 (see FIG. 5(*a*)). The room unit CPU 14 transmits the request signal to the control unit 20 via the data line L1*a* of the room unit line L1. In this case, identification information for specifying the room unit 10A is also transmitted to the control unit 20.

Succeedingly, when the control unit CPU 21 receives the request signal, the control unit CPU checks a use state of the channels of the room unit line L1, determines whether the requested information can be acquired, and transmits a determination result to the room unit 10A via the data line L1*a* (step S102). In this case, the control unit CPU 21 checks whether the second channel L1*c* capable of transmitting the acquired information is vacant. If the second channel L1*c* is vacant, the control unit CPU 21 transmits a message representing that information can be acquired, for example, a message representing "Information is acquired. Please wait a moment." to the room unit 10A via the data line L1*a*.

Figure 5:
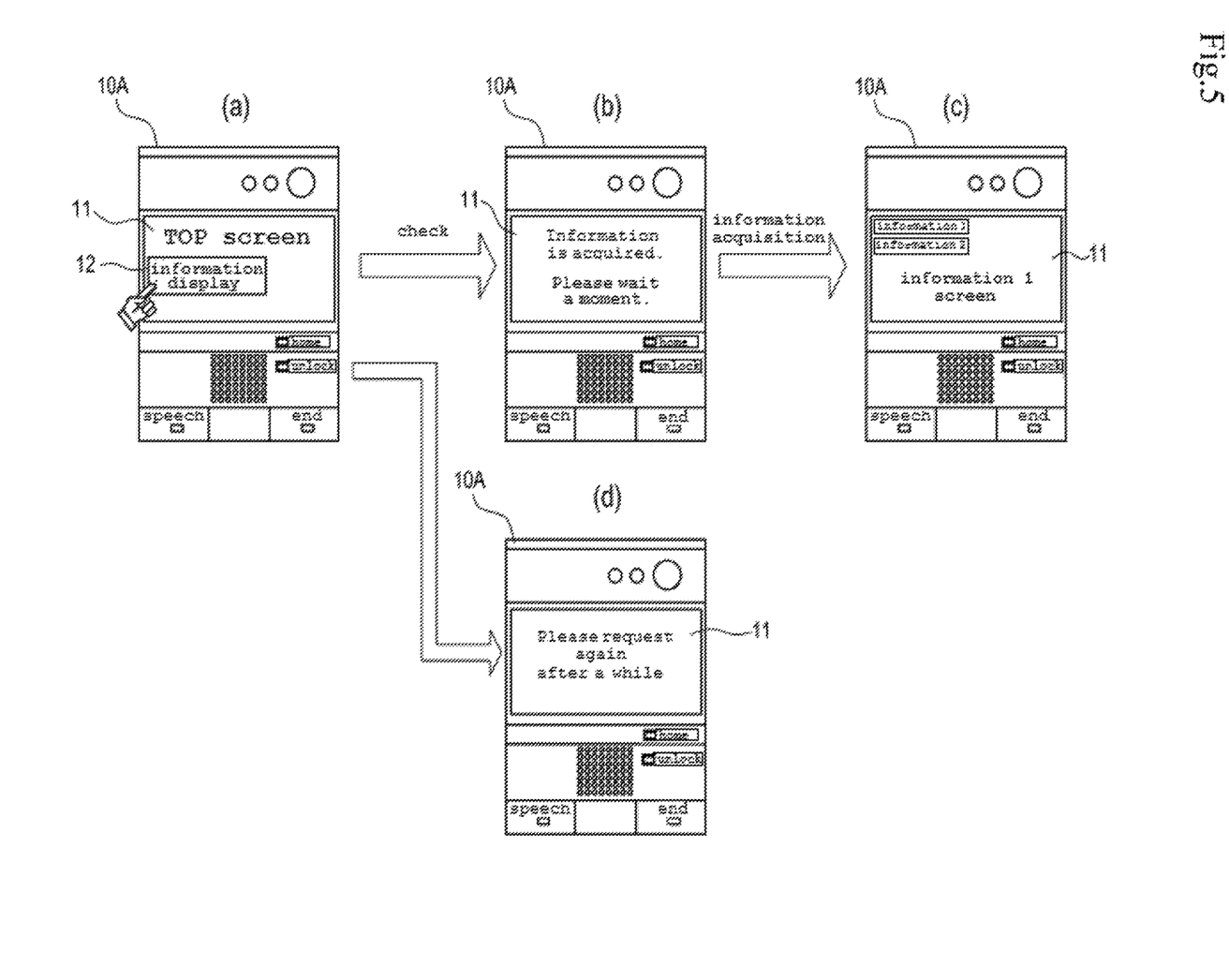
FIG. 5(a) to FIG. 5(d) are diagrams showing an example of a screen displayed stepwise on the room unit in accordance with the operation of acquiring information.

Succeedingly, when the room unit CPU 14 receives the message, the room unit CPU causes the display part 11 to display content of the message and waits until information is transmitted (see step S103*a*, FIG. 5(*b*)).

Succeedingly, the control unit CPU 21 connects to the communication network T, then acquires (downloads) the information of "electricity usage quantity (bar graph representing time change) on Apr. 9, 2014" of Room 101 and transmits the downloaded information (external information) to the room unit 10A via the second channel L1*c* (step S104).

Figure 6:
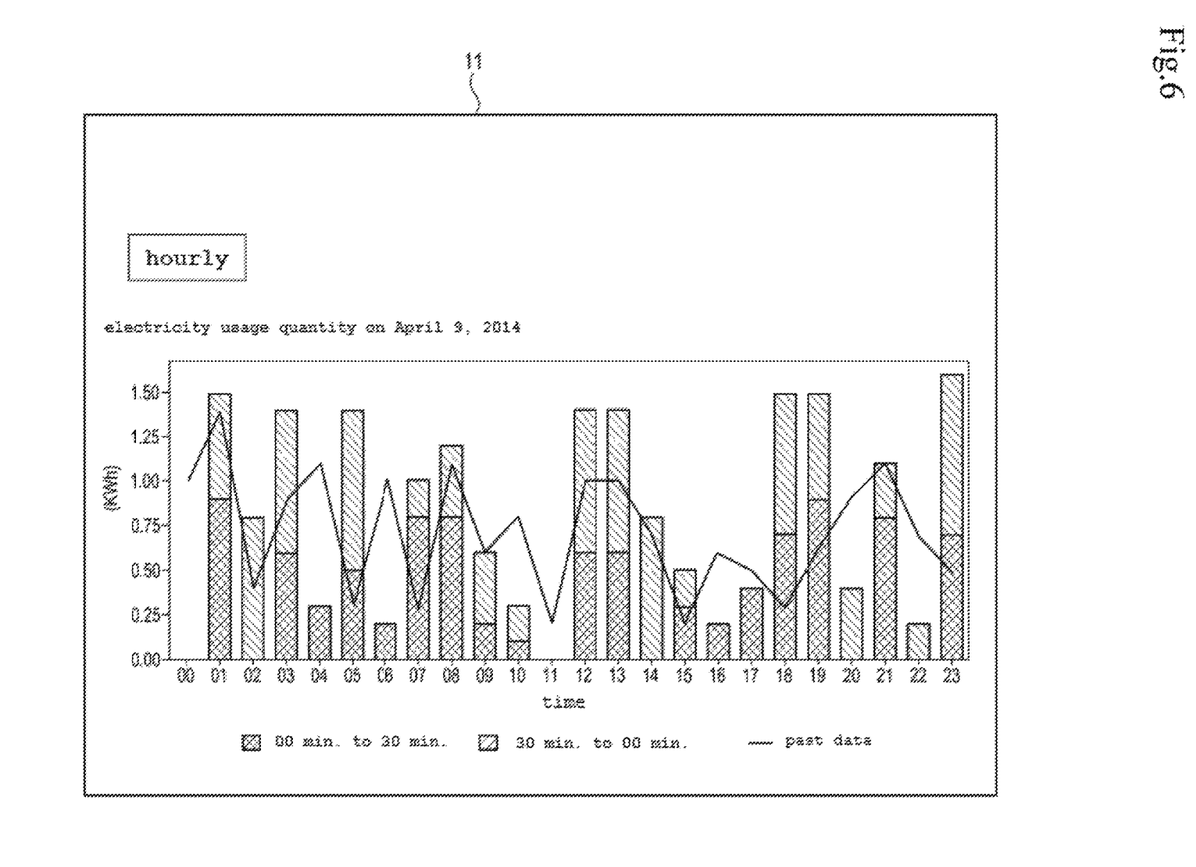
FIG. 6 is a diagram showing an example of acquired information displayed on the room unit.

Succeedingly, the room unit CPU 14 causes the display part 11 to display the received external information (see step S105, FIG. 5(*c*) and FIG. 6). The room unit CPU stores the received external information in the storage part 15.

In contrast, in step S102, if the second channel L1*c* is not vacant, the control unit CPU 21 transmits a message representing that information cannot be acquired, for example, a message representing "Please request again after a while." to the room unit 10A via the data line L1*a* (No in step S102). Examples of the case of not being vacant include a case where the second channel L1*c* is already used due to a request for information acquisition from another room unit, and a case where this channel is already used for a speech. In this case, processing of acquiring information from the external server S is not performed. The room unit CPU 14 causes the display part 11 to display content of the received message (see step S103*b*, FIG. 5(*d*)).

According to the intercom system 1 for an apartment house of this embodiment described above, the control unit 20 can acquire external information, which is requested from the room unit 10 via the intercom line (the second channel L1*c* of the room unit line L1), from the external server S via the communication network T and transmit the acquired external information to the room unit 10 via the intercom line (the second channel L1*c* of the room unit line L1). Thus, the room unit 10 can obtain a function of acquiring desired information from the outside without being provided with a communication part for directly communicating with the external communication network T.

A case where the room unit 10 can acquire desired information from the external server S via the control unit 20 is limited to a case where the second channel L1*c* is vacant (a case where this channel is not used for another function). Thus, it is possible to suppress a situation where the second channel L1*c* becomes busy due to backlog caused by concentration of request signals in the second channel L1*c*.

For example, the room unit line L1 may be configured by a single data line L1*a* and three channels (first channel L1*b* to third channel L1*d*: not shown), and two (the second channel L1*c* and the third channel L1*d*) of these channels may each be set as a general purpose line. In this case, the determination processing in step S102 concerning whether the requested information can be acquired may be performed in a manner that the control unit CPU 21 checks a use state of the second channel L1*c* and the third channel L1*d*, and when at least one of these channels is vacant, transmits to the room unit 10A a message representing that information can be acquired. Alternatively, the control unit CPU may transmit a message representing that information can be acquired when both of the second channel L1*c* and the third channel L1*d* are vacant. In this case, the system can be surely ready for use of emergency broadcast or the like.

Further, a message representing whether external information can be acquired is transmitted quickly from the control unit 20 in response to the request signal transmitted from the room unit 10 side, and thus an operator can easily request, desired information at ease.

In this manner, according to the intercom system 1 for an apartment house, multifunctionality of the room unit 10 can be achieved while suppressing cost increase due to addition of the communication part.

In many cases, the number of main lines (communication lines) of the intercom line is small (for example, two as described above, that is, the first and second channels) as compared with the total number of rooms of the apartment house. This is because the number of main lines is designed based on a use frequency of the intercom line. When a visitor calls a room from the apartment entrance unit, at least one of the communication lines becomes busy. For example, if residents of individual rooms start using the intercom line configured by two communication lines, the intercom line is likely congested. Thus, an important role of the intercom (communication and broadcast in an emergency, etc.) may not be played sufficiently. To address this problem, it is considered to employ the following method of assigning priority order to uses of the communication lines so that a use in an emergency has a higher priority.

Figure 7:
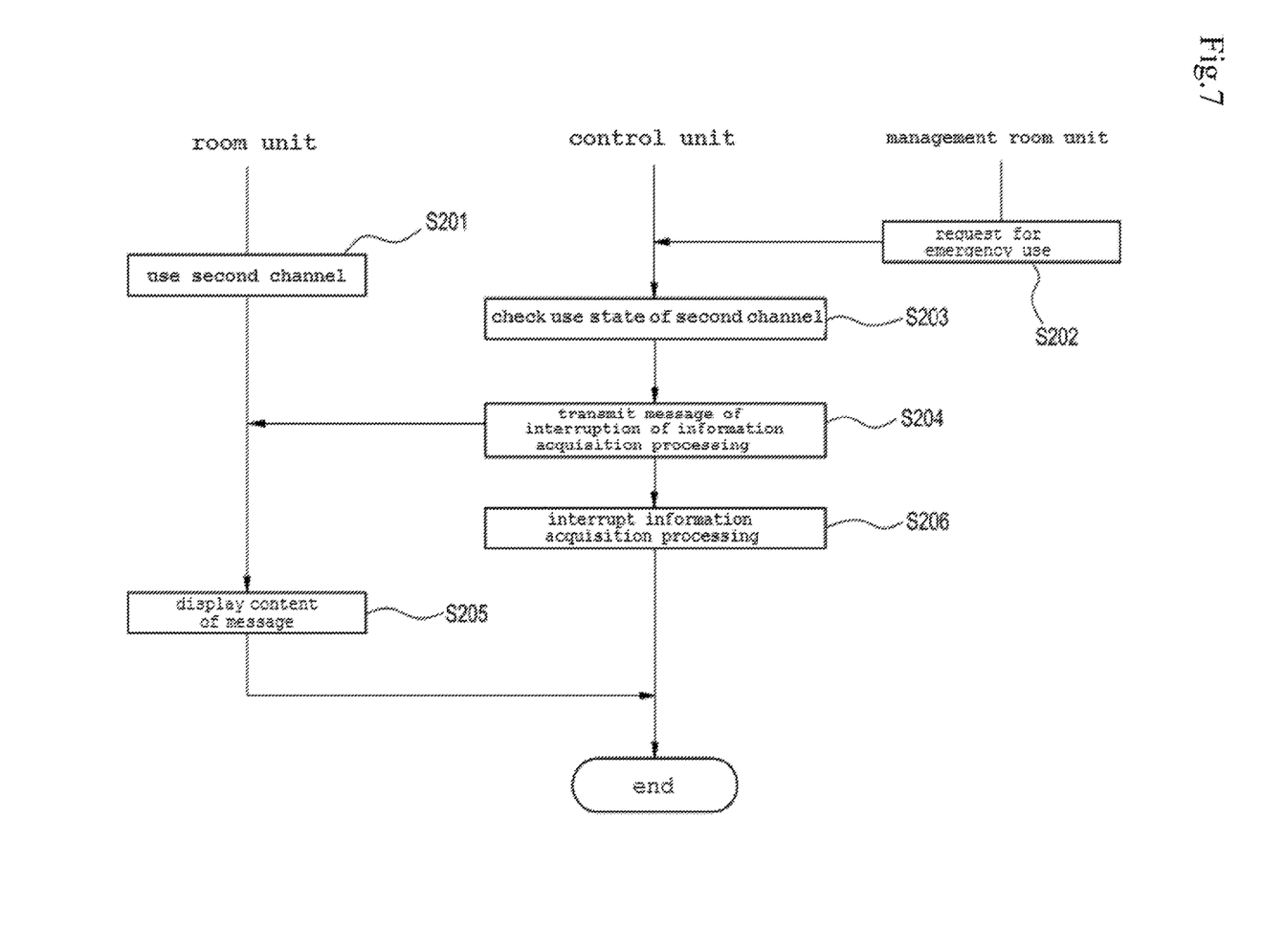
FIG. 7 is a flowchart for explaining an operation in which processing of acquiring information is interrupted.

Explanation will be made with reference to FIG. 7 as to an operation when acquisition processing of external information is interrupted.

As an operation state in which processing may be interrupted, fox example, it is supposed that the second channel L1*c* of the room unit line L1 is used in response to a request for information acquisition from the room unit 10A (step S201). In this state, an emergency signal requesting for emergency use of the intercom line is supposed to be transmitted to the control unit 20 from the management room unit 40 in step S201 (step S202).

In response to the emergency signal, the control unit CPU 21 checks whether the second channel L1*c* is used (step S203). As a result of the check, for example, if the second channel is used for the information acquiring function or the speech function, the use for this function is interrupted. In this embodiment, as the second channel is used for the information acquisition requested from the room unit 10A, this use for the information acquisition is interrupted.

The control unit CPU 21 transmits a message representing that the information acquisition processing will be interrupted, for example, a message representing "Processing will be interrupted for emergency." to the room unit 10A via the data line L1*a* (step S204).

The room unit CPU 14 causes the display part 11 to display content of the received message (step S205).

The control unit CPU 21 interrupts the information acquisition processing and releases the second channel L1*c* (step S206). Consequently, the second channel L1*c* thus released is used for emergency broadcast of a higher priority.

According to this configuration, priority order is assigned to the individual functions using the second channel L1*c* in a manner that the emergency broadcast or the like has a higher priority than the information acquiring function and the speech function. Thus, emergency functions of the intercom (emergency broadcast to each room, and the like) can be surely executed.

For example, if a termination button is operated on the room unit 10A side during the processing of acquiring external information from the external server S, the control unit CPU 21 terminates the processing responding to the request for information acquisition. Thus, the room unit 10A causes the display part 11 to turn off an image having been displayed thereon. For example, if a home button is operated on the room unit 10A side, the processing responding to the request for information acquisition is interrupted and the room unit 10A causes the display part 11 to restore the display of a TOP screen.

For example, the control unit 20 may acquire external information requested by the room unit 10 in a preset time zone (a time zone of a relatively low use-frequency of the intercom line (the room unit line L1, and the like) during one day, for example, a time zone from 2:00 am to 3:00 am). Further, as well as the information acquisition processing, for example, processing of periodic diagnosis for checking whether the intercom line operates normally may be performed simultaneously in the same time zone. According to this configuration, the control unit 20 can surely acquire external information from the external server S using the time zone of a low use-frequency, for example, a night time zone. Further, when the periodic diagnosis of the intercom line as well as the acquisition of external information is executed in the time zone of a low use-frequency of the intercom line, the intercom line can be used efficiently even in a time zone of a high use-frequency.

The invention is not limited to the embodiment described above and, for example, can be suitably modified and improved. In addition, the material, shape, size, numerical value, mode, number, arrangement position, etc. of each of the constituent elements in the embodiment are not particularly limited and may be set optionally so long as the invention can be achieved.

Although the invention is explained in detail with reference to the particular embodiment, it will be apparent for those skilled in the art that various changes and modifications are possible without departing from the spirit and range of the invention.

This application is based on Japanese Patent Application No. 2015-17783 filed on Jan. 30, 2015, the content of which is incorporated herein by reference.

1: intercom system for apartment house, 10 (10A, 10B): room unit, 11: display part, 12: operation part, 13: communication part, 20: control unit, 30 (30A, 30B): apartment entrance unit, 40 (40A, 40B): management room unit, 50: connection unit, L1: room unit line, L1*a*: data line. L1*b*: first channel. L1*c*: second channel, L2: entrance unit line, L3: management room unit line

The invention claimed is:

1. An intercom system for an apartment house, comprising:
    room units which are installed in respective rooms of the apartment house; and
    a control unit which is connected to the room units of the respective rooms via an intercom line so as to be capable of communicating therewith, and is capable of communicating with an external server via an external communication network, wherein
    the control unit acquires, based on a request signal transmitted from the room unit via the intercom line, predetermined information corresponding to the request signal from the external server via the external communication network, and transmits the acquired predetermined information via the intercom line to the room unit which transmitted the request signal, wherein
    the intercom line includes at least two communication channels, and the control unit checks a use state of the intercom line when receiving the request signal, and acquires the predetermined information from the external server when the intercom line has a vacant channel, and
    wherein,
    priority order is assigned to plural functions using the intercom line,
    the plural functions includes an information acquiring function in which the room unit acquires the predetermined information from the external server via the control unit, and
    when a function having a higher priority than the information acquiring function is required to be used while the predetermined information is transmitted to the room unit via the intercom line, the control unit interrupts the information acquiring function and releases the channel of the intercom line having been used for the information acquiring function.

2. The intercom system for an apartment house according to claim 1, wherein
    the control unit checks a use state of the intercom line when receiving the request signal, and acquires the predetermined information from the external server when the intercom line has two or more vacant channels.

3. The intercom system for an apartment house according to claim 1, wherein
    the control unit transmits to the room unit a message representing that the predetermined information can be transmitted when the intercom line has a vacant channel, while transmits to the room unit a message representing that the predetermined information cannot be transmitted when the intercom line has not any vacant channel for transmitting the predetermined information.

4. The intercom system for an apartment house according to claim 1, wherein
    the control unit acquires the predetermined information from the external server in a preset time zone.

5. The intercom system for an apartment house according to claim 1, wherein
    the time zone is a time zone during which a use-frequency of the intercom line is relatively low in one day.

6. The intercom system for an apartment house according to claim 5, wherein the control unit performs, in the time zone, periodic diagnosis of the intercom line simultaneous with an operation of acquiring the predetermined information from the external server and transmitting to the room unit.

7. An intercom system for an apartment house, comprising:
room units which are installed in respective rooms of the apartment house; and
a control unit which is connected to the room units of the respective rooms via an intercom line so as to be capable of communicating therewith, and is capable of communicating with an external server via an external communication network, wherein
the control unit acquires, based on a request signal transmitted from the room unit via the intercom line, predetermined information corresponding to the request signal from the external server via the external communication network, and transmits the acquired predetermined information via the intercom line to the room unit which transmitted the request signal,
wherein the time zone is a time zone during which a use-frequency of the intercom line is relatively low in one day, and
the control unit performs, in the time zone, periodic diagnosis of the intercom line simultaneous with an operation of acquiring the predetermined information from the external server and transmitting to the room unit.

8. The intercom system for an apartment house according to claim 7, wherein
the intercom line includes at least two communication channels, and
the control unit checks a use state of the intercom line when receiving the request signal, and acquires the predetermined information from the external server when the intercom line has a vacant channel.

9. The intercom system for an apartment house according to claim 8, wherein
the control unit checks a use state of the intercom line when receiving the request signal, and acquires the predetermined information from the external server when the intercom line has two or more vacant channels.

10. The intercom system for an apartment house according to claim 8, wherein
the control unit transmits to the room unit a message representing that the predetermined information can be transmitted when the intercom line has a vacant channel, while transmits to the room unit a message representing that the predetermined information cannot be transmitted when the intercom line has not any vacant channel for transmitting the predetermined information.

11. The intercom system for an apartment house according to claim 8, wherein
priority order is assigned to plural functions using the intercom line,
the plural functions includes an information acquiring function in which the room unit acquires the predetermined information from the external server via the control unit, and
when a function having a higher priority than the information acquiring function is required to be used while the predetermined information is transmitted to the room unit via the intercom line, the control unit interrupts the information acquiring function and releases the channel of the intercom line having been used for the information acquiring function.

12. The intercom system for an apartment house according to claim 7, wherein
the control unit acquires the predetermined information from the external server in a preset time zone.

13. An intercom system for an apartment house, comprising:
room units which are installed in respective rooms of the apartment house; and
a control unit which is connected to the room units of the respective rooms via an intercom line so as to be capable of communicating therewith, and is capable of communicating with an external server via an external communication network, wherein
the control unit acquires, based on a request signal transmitted from the room unit via the intercom line, predetermined information corresponding to the request signal from the external server via the external communication network, and transmits the acquired predetermined information via the intercom line to the room unit which transmitted the request signal;
wherein the control unit acquires the predetermined information from the external server in a preset time zone;
wherein the time zone is a time zone during which a use-frequency of the intercom line is relatively low in one day;
and wherein the control unit performs, in the time zone, periodic diagnosis of the intercom line simultaneous with an operation of acquiring the predetermined information from the external server and transmitting to the room unit.

14. The intercom system for an apartment house according to claim 13, wherein
the intercom line includes at least two communication channels, and
the control unit checks a use state of the intercom line when receiving the request signal, and acquires the predetermined information from the external server when the intercom line has a vacant channel.

15. The intercom system for an apartment house according to claim 14, wherein
the control unit checks a use state of the intercom line when receiving the request signal, and acquires the predetermined information from the external server when the intercom line has two or more vacant channels.

16. The intercom system for an apartment house according to claim 14, wherein
the control unit transmits to the room unit a message representing that the predetermined information can be transmitted when the intercom line has a vacant channel, while transmits to the room unit a message representing that the predetermined information cannot be transmitted when the intercom line has not any vacant channel for transmitting the predetermined information.

17. The intercom system for an apartment house according to claim 14, wherein
priority order is assigned to plural functions using the intercom line,
the plural functions includes an information acquiring function in which the room unit acquires the predetermined information from the external server via the control unit, and when a function having a higher priority than the information acquiring function is required to be used while the predetermined information is transmitted to the room unit via the intercom line, the control unit interrupts the information acquiring function and releases the channel of the intercom line having been used for the information acquiring function.

* * * * *